(12) United States Patent
Hikosaka et al.

(10) Patent No.: US 6,620,533 B2
(45) Date of Patent: Sep. 16, 2003

(54) MAGNETIC RECORDING MEDIUM

(75) Inventors: Takashi Hikosaka, Tokyo (JP); Futoshi Nakamura, Yamato (JP); Hideo Ogiwara, Tachikawa (JP); Soichi Oikawa, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 77 days.

(21) Appl. No.: 09/778,957

(22) Filed: Feb. 8, 2001

(65) Prior Publication Data

US 2001/0033449 A1 Oct. 25, 2001

(30) Foreign Application Priority Data

Feb. 8, 2000 (JP) ........................................ 2000-030727

(51) Int. Cl.$^7$ .............................. G11B 5/66; G11B 5/70
(52) U.S. Cl. .............................. 428/694 T; 428/694 TS; 428/694 TM; 428/900
(58) Field of Search ....................... 428/694 T, 694 TS, 428/694 TB, 900, 694 TM

(56) References Cited

U.S. PATENT DOCUMENTS

| 4,764,436 | A | * | 8/1988 | Akutsu et al. | ............... 428/694 |
| 5,173,370 | A | * | 12/1992 | Takahashi et al. | ........... 428/694 |
| 5,326,637 | A | * | 7/1994 | Nasu et al. | .................. 428/336 |
| 5,780,135 | A | * | 7/1998 | Kikitsu et al. | .............. 428/65.3 |
| 6,248,416 | B1 | * | 6/2001 | Lambeth et al. | ............ 428/65.3 |
| 6,403,203 | B2 | * | 6/2002 | Futamoto et al. | ............ 428/212 |

* cited by examiner

*Primary Examiner*—Holly Rickman
(74) *Attorney, Agent, or Firm*—Pillsbury Winthrop LLP

(57) ABSTRACT

By using a magnetic recording medium in which the value of $Hk/4\pi Ms$ calculated from the anisotropic magnetic field Hk and the saturation magnetization Ms falls within a range of more than 2 and less than 5, the resistance to the thermal decay can be improved and a magnetic recording can be achieved with a high recording resolution and a good medium S/N without increasing the head magnetic field.

16 Claims, 3 Drawing Sheets

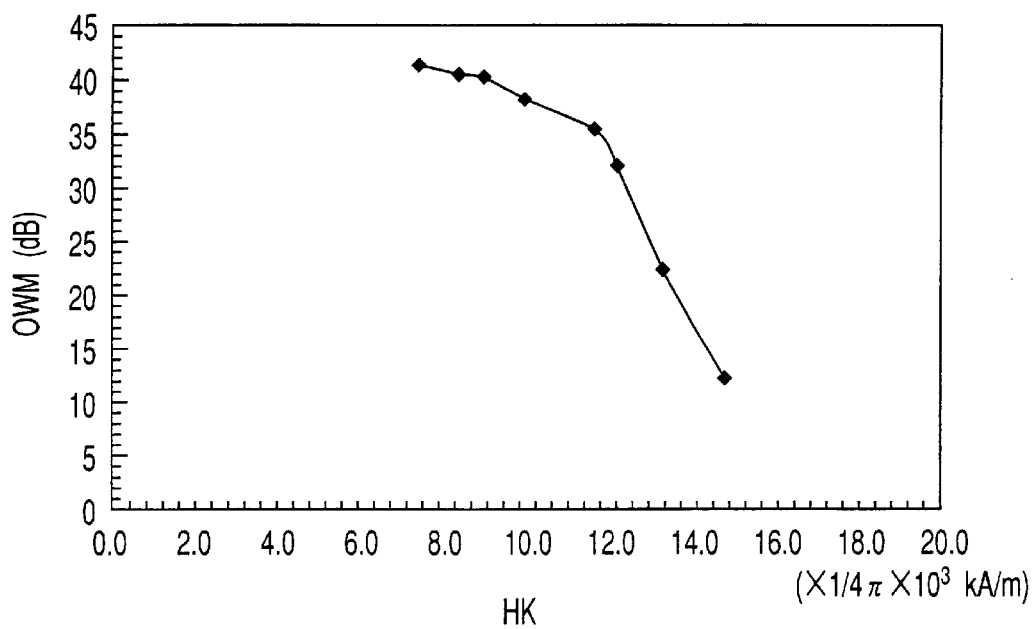
F I G. 3
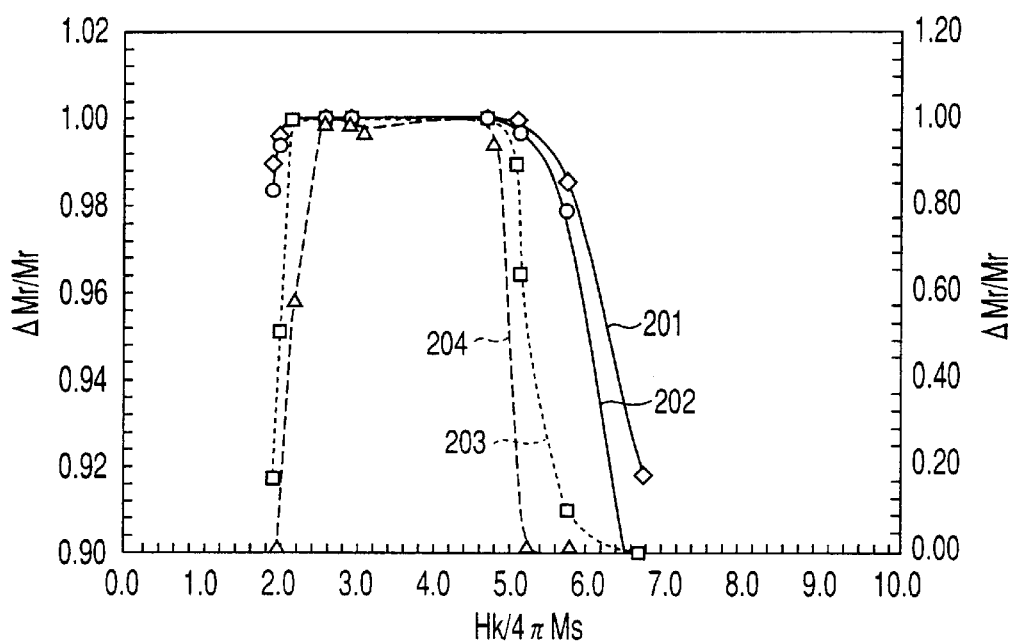
F I G. 4

MAGNETIC RECORDING MEDIUM

CROSS-REFERENCE TO RELATED APPLICATIONS

This application is based upon and claims the benefit of priority from the prior Japanese Patent Application No. 2000-030727, filed Feb. 8, 2000, the entire contents of which are incorporated herein by reference.

BACKGROUND OF THE INVENTION

The present invention relates to a magnetic recording/reading apparatus of a perpendicular magnetic recording system and a magnetic recording medium used therein.

For the requirement of improving recording density in the magnetic recording it has been clarified that it is difficult to manage the reduction of the medium noise and the improvement in the resistance to the thermal decay.

One of the methods for solving the problem is to use a material that permits increasing the magnetic anisotropy energy owned by the layer of a magnetic recording medium. However, in the case of using a material having a large magnetic anisotropy field in an attempt to increase the anisotropy energy, a problem is generated that it is difficult to record information sufficiently with a writing head in a magnetic recording medium obtained by using the particular material. On the other hand, in the case of using a material having a large saturation magnetization without increasing the intensity of the anisotropy field, the magnetostatic coupling among the drains is increased so as to make it difficult to suppress the noise.

Also studied in this technical field is a perpendicular magnetic recording system in which the recording is performed by achieving the magnetization in a direction perpendicular to the planer direction of the magnetic layer. In this system, a demagnetizing field by the adjacent bit does not exert on the magnetization transition region unlike the longitudinal recording in which the magnetization takes place in the longitudinal direction. In this system, a magnetization from the adjacent bit exerts in a direction of stabilizing the magnetization in the magnetization transition region and, thus, this system is stable in a recorded state at a high density and is considered advantageous for the high density recording. Since the perpendicular recording is capable of maintaining a high resolution even if the magnetic film has a large thickness, compared with the longitudinal recording medium, the perpendicular recording is considered advantageous in the thermal stability, too. Such being the situation, the perpendicular recording has come to attract attentions in this respect, too. However, in the case of the perpendicular magnetic recording system, it is reported that the influence of the demagnetizing field within its bit is strongly received because of the thin film shape effect the low recording density, with the result that the reduction of the reproduction output is large in the low recording density. It follows that it is now necessary to improve the resistance to the thermal decay in respect of the perpendicular recording system, too.

It is pointed out that a double-layered recording medium consisting of a magnetic recording layer and a relatively thick soft magnetic layer formed below the magnetic recording layer, which is also being studied in the respect of thermal stability nowadays, is not a perfect solution. In the perpendicular magnetic recording medium, it is effective to increase the anisotropy energy of the magnetic layer as in the longitudinal recording medium. However, if the anisotropy is unduly increased, it is difficult to perform information writing with a head. Therefore, it is necessary to take measures for the resistance to the thermal decay without increasing anisotropy energy.

BRIEF SUMMARY OF THE INVENTION

A first object of the present invention, which has been achieved in an attempt to solve the above-noted problems inherent in the prior art, is to provide a magnetic recording medium used in a perpendicular recording system, which permits improving the resistance to the thermal decay, the recording resolution, and the medium S/N without increasing the head magnetic field.

A second object of the present invention is to provide a magnetic recording/reading apparatus, which permits improving the resistance to the thermal decay and also permits performing a magnetic recording of a high recording resolution and a high medium S/N without increasing the head magnetic field.

According to a first aspect of the present invention, there is provided a magnetic recording medium comprising a substrate; and a perpendicular magnetic layer formed on said substrate and having an anisotropic magnetic field Hk and a saturation magnetization Ms which satisfy the following relation:

$$2 < Hk/4\pi Ms < 5.$$

According to a second aspect of the present invention, there is provided a magnetic recording/reading apparatus, comprising:

a magnetic recording medium;

a drive mechanism configured to support and rotate said magnetic recording medium; and a magnetic head configured to record/reproduce information in and from the magnetic recording medium;

wherein said magnetic recording medium has an anisotropic magnetic field Hk and a saturation magnetization Ms which satisfy the following relation:

$$2 < Hk/4\pi Ms < 5.$$

According to the present invention, the value of $Hk/4\pi Ms$ is defined to fall within a range of more than 2 and less than 5 so as to make uniform the resistance to the thermal decay of magnetic particles in the magnetic film. As a result, it is possible to make uniform the magnetic reversal field of magnetic particles of the magnetic recording medium so as to carry out the magnetic recording of a high recording resolution and a high medium S/N.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a graph showing the relationship between Hk of the magnetic recording medium for a perpendicular recording system and OWM;

FIG. 4 is a graph showing the relationship between Hk/4πMs of the magnetic recording medium for a perpendicular recording system and ΔMr/Mr.

DETAILED DESCRIPTION OF THE INVENTION

The magnetic recording medium of the present invention comprises a substrate and a perpendicular magnetic layer formed on the substrate and is featured in that the perpendicular magnetic layer has an anisotropic magnetic field Hk and a saturation magnetization Ms satisfy the relation following.

$$2 < Hk/4\pi Ms < 5$$

The present invention also provides a magnetic recording/reading apparatus, comprising the above magnetic recording medium, a driving means for supporting and rotating said magnetic recording medium, and a magnetic head for recording/producing information in and from the magnetic recording medium.

In a magnetic recording medium of a perpendicular recording system, the magnetic anisotropy is increased with increase in Ms. However, the values of Ms are dispersed within the magnetic layer because of, for example, the nonuniformity in the composition of the magnetic layer so as to bring about nonuniformity of the anisotropy energy. However, if the value of Hk/4πMs of the magnetic recording medium is defined to fall within a range of more than 2 and less than 5, the change in the anisotropy energy of the magnetic particles is offset with the change in the diamagnetic field so as to make uniform the resistance of the magnetic particles to the thermal fluctuation. In the present invention, the value of Hk/4πMs is defined as pointed out above so as to make uniform the resistance of the magnetic particles to the thermal fluctuation, which result in the uniform magnetization reversal of the magnetic particles, thereby eliminating the nonuniformity in the transition positions of the magnetization, making the transition of magnetization sharp so as to improve the recording resolution, and diminishing the medium noise so as to improve the medium S/N.

It is more desirable for the value of Hk/4πMs to fall within a range of between 2.5 and 4.5. Further, it is desirable for the magnetic layer to contain CoPtCrO based alloy as a main component.

The present invention will now be described in detail with reference to the accompanying drawings.

Figure 1:
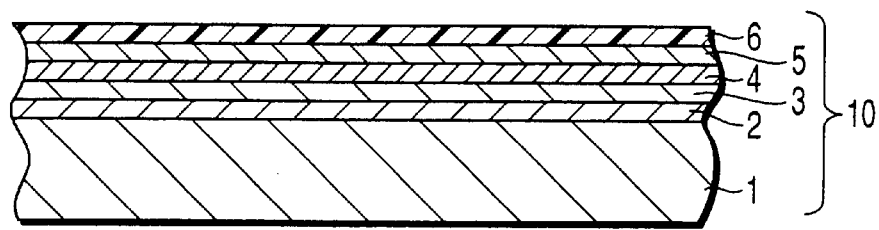
FIG. 1 is a cross sectional view exemplifying the construction of a magnetic recording medium according to the present invention.

A magnetic recording medium for a perpendicular recording according to the present invention was prepared as follows. FIG. 1 is a cross sectional view showing as an example the construction of a magnetic recording medium 10 of the present invention. As shown in the drawing, the magnetic recording medium 10 comprises a seed layer 2, an underlying layer 3, a perpendicular magnetic film 4, a protective film 5 and a lubricating layer 6, which are formed in the order mentioned on a substrate 1.

In the first step, prepared was the substrate 1 having a diameter of 2.5 inches and made of a chemically reinforced alumino•silicic acid glass, followed by forming the Ti series seed layer 2 and the Ru series underlying layer 3 on the substrate 1 in an attempt to improve the perpendicular orientation, and reduce the grain size. Then, the CoPtCrO series perpendicular magnetic film 4 was formed on the underlying film 3 by a sputtering method using a CoPtCr series target. Further, the protective film 5 made of, for example, carbon was formed on the perpendicular magnetic film 4, followed by forming the lubricating layer 6 coated by, for example, perfluoro-polyether on the protective film 5, thereby obtaining the magnetic recording medium of the construction shown in FIG. 1.

The magnetic characteristics of the magnetic recording medium thus prepared were measured by a vibrating sample type magnetometer (VSM) so as to evaluate the resistance to the thermal decay in terms of the change with time ΔMr/Mr in the residual magnetization Mr. The change with time ΔMr/Mr represents a ratio of the magnetization a predetermined time later relative to the initial magnetization. At this time, Hk is obtained from a longitudinal MH loop.

Figure 2:
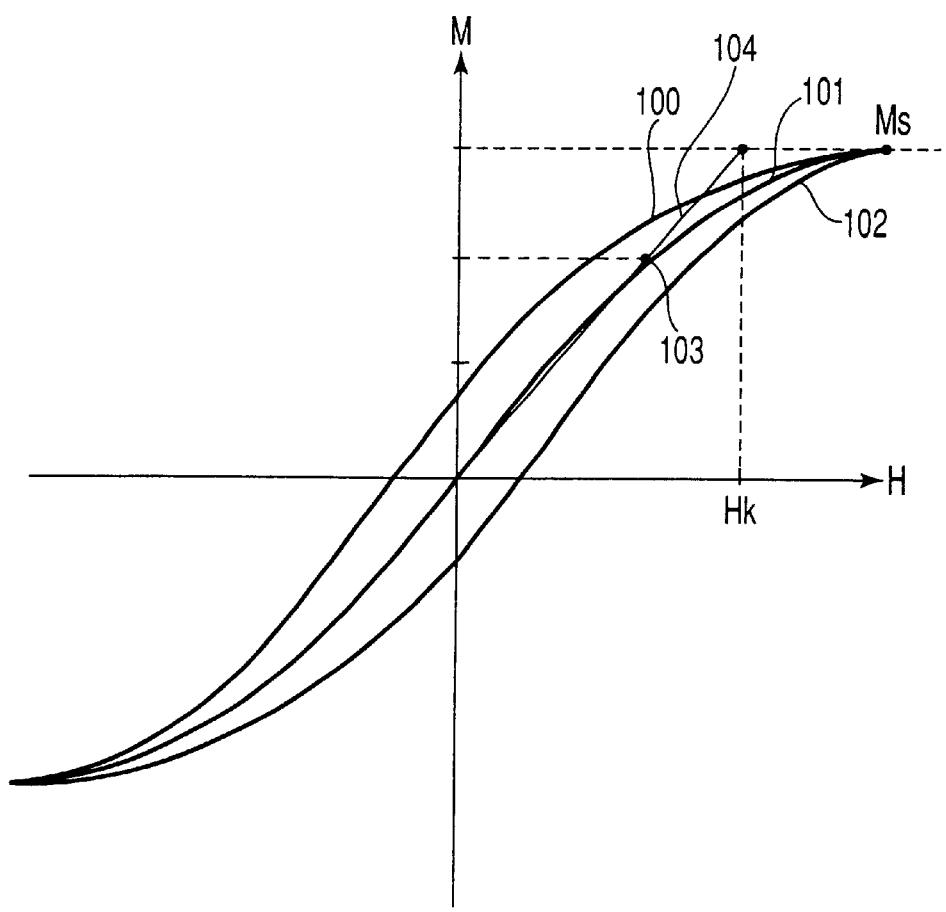
FIG. 2 is a graph showing MH loop for defining Hk value.

FIG. 2 is a graph showing the MH loop in the case where a magnetic field is applied in the longitudinal direction. As shown in the graph, a longitudinal MH loop is measured and a curve 101 is obtained by averaging a curve 100 on the positive side of applying magnetization and a curve 102 on the negative side of applying magnetization. Also obtained is a straight line 104 joining the origin of the graph and a point 103 on the curve 101 where the magnetization is ⅔ the saturation magnetization. Hk used in the present invention is defined to be a magnetic field at which the straight line 104 noted above represents the saturation magnetization.

Concerning the change in Mr, a magnetic field of 1440 A/m is once applied, followed by measuring the change in Mr under the state of removing the magnetic field so as to obtain the change in Mr 6000 seconds later and 9000 seconds later. Also, the change in the magnetization $1 \times 10^6$ seconds later and $1 \times 10^8$ seconds later was estimated from the change in Mr thus obtained.

The medium was used in combination with a ring type recording•GMR reading head so as to evaluate the overwrite modulation (OWM) and the medium S/M.

The magnetic characteristics of the film were controlled by changing the Cr content of the CoPtCr target and the film forming conditions. OWM was measured by recording 200 FCI on 100 kFCI relative to the recording current having the maximum output of 10 kFCI.

Also, the medium S/N was obtained as a ratio of the rms noise value to the peak to peak value of the dipulse of the obtained 10 kFCI, which was converted into a track width of 1 μm.

FIG. 3 is a graph showing the change in OWM relative to the change in Hk. As apparent from the graph, if the recording is performed under the conditions that permit ensuring at least 32 dB of OWM, it has been found that it is satisfactory for Hk to be about 960K A/m or less in the combination of the head with a CoPtCrO series perpendicular magnetic layer.

Under the circumstances, a magnetic layer was formed by changing the film-forming conditions such as the sputtering power, the sputtering gas pressure within the chamber, the oxygen content in the sputtering gas, the temperature of the substrate when sputtering, and the preparation time before sputtering in respect of one of the target compositions that permit Hk to be about 960K A/m so as to prepare samples 1-1 to 1-11 of the magnetic recording medium. The Cr content of the target was 16 at %, and the Pt content of the target was 20 at %. Also, the oxygen concentration in each of the magnetic layers thus obtained was 30 at %.

In respect of these samples, the medium S/N and the attenuation ratio ΔMr/Mr of the residual magnetization Mr, which is an evaluation of the resistance to the thermal decay, were measured various periods of time later. Also, the isolated regeneration signal was differentiated and $PW_{50}$ (nm) giving a recording resolution was obtained from the half width of the differentiated value.

Table 1 shows the values of Hk, 47πMs, Hk/4πMs, medium S/N, resistance to thermal fluctuation (ΔMr/Mr), S/N ratio, and $PW_{50}$.

between 2 and 5. However, in the case where the value of Hk/4πMs failed to fall within the range noted above, the shoulder portion of the perpendicular MH loop was found to flag so as to become roundish. This implies that the resistance to the thermal decay is uniform when the value of Hk/4πMs is larger than 2 and smaller than 5.

Also, satisfactory results were obtained in respect of the medium S/Nm in the case where the value of Hk/4πMs fell within the range of larger than 2 and smaller than 5, as apparent from Table 1. Specifically, the S/N was not lower

TABLE 1

| SAMPLE | Hk/4πMs | ΔMr/Mr | | | | So/Nm (dB) | PW50 (nm) |
| --- | --- | --- | --- | --- | --- | --- | --- |
| | | 6000 seconds later | 9000 seconds later | 1000000 seconds later | 100000000 seconds later | | |
| 1-1 | 6.63 | 0.917 | 0.879 | 0.000 | 0.000 | 22.2 | 132 |
| 1-2 | 5.654206 | 0.986 | 0.979 | 0.091 | 0.000 | 23.1 | 124 |
| 1-3 | 5.03 | 0.997 | 0.996 | 0.642 | 0.000 | 24.2 | 119 |
| 1-4 | 4.98 | 0.999 | 0.999 | 0.892 | 0.000 | 25.3 | 98 |
| 1-5 | 4.63 | 1.000 | 1.000 | 0.999 | 0.933 | 26.2 | 97 |
| 1-6 | 2.96 | 1.000 | 1.000 | 1.000 | 0.961 | 27.3 | 99 |
| 1-7 | 2.8 | 1.000 | 1.000 | 1.000 | 0.979 | 28.2 | 95 |
| 1-8 | 2.49 | 1.000 | 1.000 | 1.000 | 0.984 | 28 | 97 |
| 1-9 | 2.09 | 1.000 | 1.000 | 0.994 | 0.575 | 26.8 | 98 |
| 1-10 | 1.9 | 0.996 | 0.994 | 0.514 | 0.000 | 24.2 | 123 |
| 1-11 | 1.82 | 0.990 | 0.984 | 0.174 | 0.000 | 23.8 | 129 |

FIG. 4 is a graph showing the relationship between Hk/4πMs and the attenuation ration ΔMr/Mr of the magnetization in respect of samples 1-1 to 1-11.

Curves 201 and 202 shown in FIG. 4 denote the values of ΔMr/Mr 6000 seconds later and 9000 seconds later, respectively. On the other hand, curves 203 and 204 in FIG. 4 denote the estimated values in the change of magnetization $1\times10^6$ seconds later and $1\times10^8$ seconds later, respectively.

When it comes to the relationship between Hk/4πMs and the change with time in Mr, the change in Mr was negligibly small when Hk/4πMs falls within a range of larger than 2 and smaller than 5, as apparent from the graph of FIG. 4. However, Mr is changed greatly where Hk/4πMs is not larger than 2 or not smaller than 5, supporting that the magnetic layer was poor in resistance to the thermal decay.

Changes in the magnetization $1\times10^6$ seconds later and $1\times10^8$ seconds later were estimated from the changes in Mr 6000 seconds later and 9000 seconds later. Where the value of 4πMs falls within a range of between a value larger than 2 and a value smaller than 5, the change in magnetization $1\times10^6$ seconds later was expected to fall within a range not larger than 10%, and the change in magnetization was expected to be rapidly increased where the value of 4πMs fails to fall within the range noted above. Likewise, where the value of 4πMs falls within a range of between a value larger than 2.5 and a value smaller than 4.5, the change in magnetization $1\times10^8$ seconds later was expected to fall within a range not larger than 10%, and the change in magnetization was expected to be rapidly increased where the value of 4πMs fails to fall within the range noted above.

Where the value of Hk/4πMs is larger than 5, the amount of change in magnetization was diminished. In this case, however, the value of $PW_{50}$ and $S_0$/Nm was poorer. In addition OWM was lowered as in the result shown in FIG. 3.

In the shape of the MH loop (not shown) measured by VSM of each medium, the flagging was scarcely found in the shoulder portion of the perpendicular MH loop in the case where the value of Hk/4πMs fell within the range of than 25 dB and $PW_{50}$ (nm) was not lower than 100 nm where the value of Hk/4πMs fell within the range noted above.

In conclusion, the experimental data given in Table 1 support that it is desirable for the perpendicular magnetization film to exhibit the value of Hk/4πMs falling within a range of between a value not smaller 2 and a value not larger than 5, preferably between a value not smaller 2.5 and a value not larger than 4.5 in order to impart an excellent resistance to the thermal decay to the magnetic recording medium.

The compositions of the magnetic layers of the samples given in Table 1 are no more than examples. What should be noted is that the effect of the present invention can be obtained as far as the magnetic layer exhibits the magnetic characteristics meeting the requirement of 2<Hk/4πMs<5, even if the compositions of the magnetic layers deviate from those shown in Table 1.

When it comes to a CoPtCrO series perpendicular magnetic layer, it is desirable for the magnetic layer to contain Co in an amount of 30 to 88 at %, Pt in an amount of 12 to 36 at %, Cr in an amount of 0 to 20 at %, and O in an amount of 0 to 40 at %. If the composition of the magnetic layer fails to fall within the range noted above, the values such as Hk and Ms tend to unduly decrease.

It is possible to form an underlying layer between the substrate and the magnetic layer, said underlying layer preferably having a HCP or FCC structure for controlling the perpendicular orientation of the magnetic layer, being made of such as a material selected from the group consisting essentially of Ru, Ti, Hf, Re, Pd, Pt, and their alloys.

It is also possible to form a seed layer which improve crystalinity between the substrate and the underlying layer, said seed layer being made of a material selected from the group consisting essentially of titanium, TiN, Ru, Hf, Re, Pd, Pt, nonmagnetic CoCr alloy, MgO, ITO, FeAl, and NiAl.

It is also possible to form a soft magnetic layer somewhere between the magnetic layer and the substrate e.g. between the substrate and the underlying layer or between the substrate and the seed layer.

Figure 5:
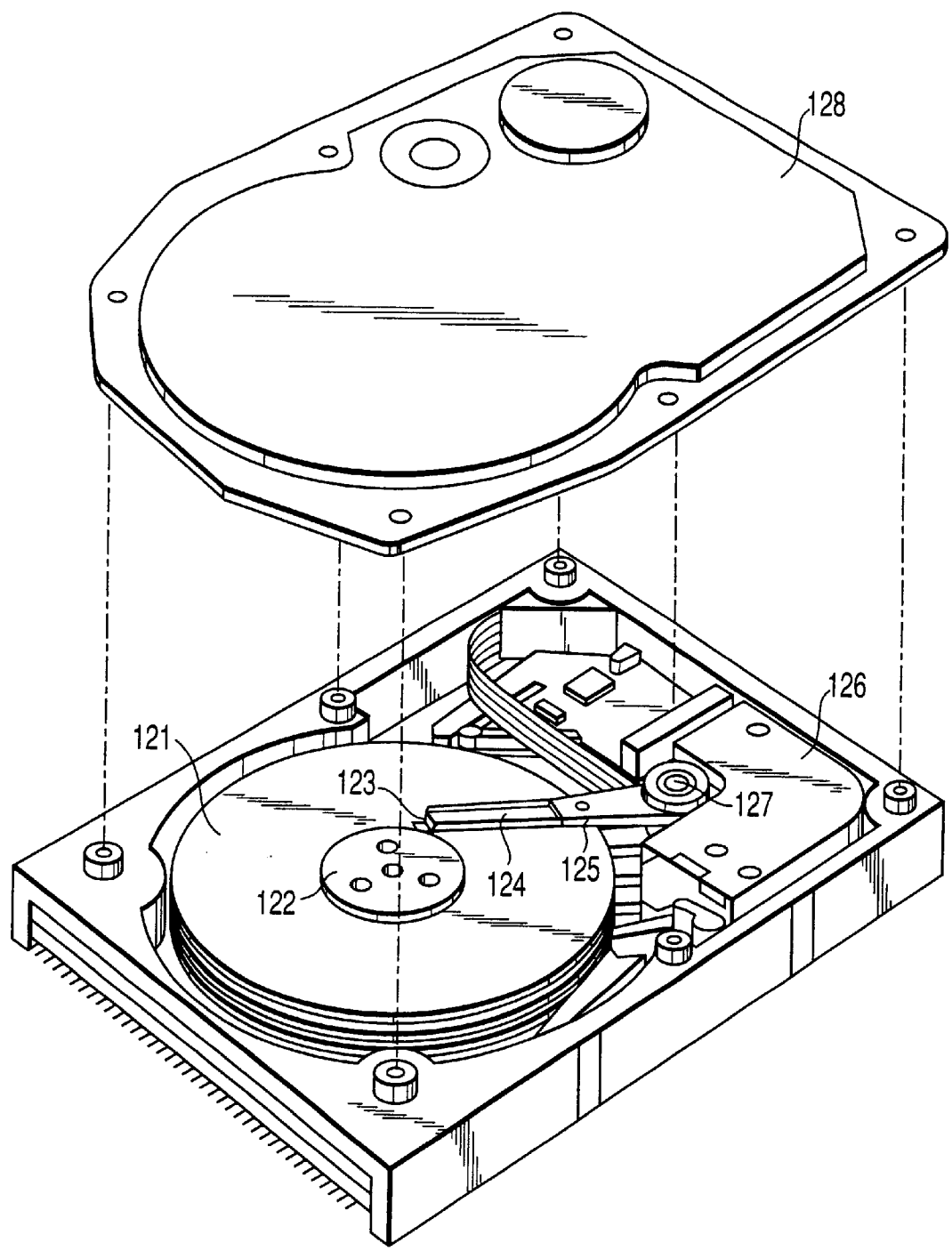
FIG. 5 schematically shows as an example a magnetic recording/reading apparatus of the present invention.

The magnetic recording medium of the present invention described above can be used in, for example, a magnetic recording/reading apparatus shown in FIG. 5. Specifically, FIG. 5 is an oblique view, partly broken away, showing an example of the magnetic recording/reading apparatus of the present invention. As shown in the drawing, a magnetic disc 121 for recording information is mounted to a spindle 122 so as to be rotated at a predetermined constant speed by a spindle motor (not shown). A slider 123 having a magnetic head mounted thereon is mounted to the tip of a suspension 124 made of a thin plate-like leaf spring. The magnetic head noted above makes access to the magnetic disk 121 so as to perform recording/reproduction of information. The suspension 124 is connected to one end of an arm 125 having a bobbin section for holding a driving coil (not shown).

A voice coil motor 126, which is a kind of a linear motor, is mounted at the other end of the arm 125. The voice coil motor 126 is formed of a magnetic circuit comprising a driving coil (not shown) wound up around the bobbin section of the arm 125, a permanent magnet arranged to face the driving coil in a manner to hold the driving coil, and a yoke facing the permanent magnet.

The arm 125 is held by ball bearings (not shown) arranged at upper and lower portions of a stationary shaft 127 and is rotated and rocked by the voice coil motor 126. In other words, the position of the slider 123 on the magnetic disc 121 is controlled by the voice coil motor 126. Incidentally, a reference numeral 128 shown in FIG. 5 denotes a lid.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium comprising:
    a substrate; and
    a perpendicular magnetic layer formed on said substrate and having an anisotropic magnetic field Hk and a saturation magnetization Ms which satisfy the following relation: $2 \leq Hk/4\pi Ms \leq 5$, and $Hk \geq 7kOe$; and
    an underlying layer formed between said substrate and said perpendicular magnetic layer and having an HCP structure or an FCC structure, and wherein a majority of said perpendicular magnetic layer is made of CoPt series alloy containing one of Cr and O.

2. The magnetic recording medium according to claim 1, wherein said underlying layer being formed of at least one material selected from the group consisting of ruthenium, titanium, hafnium, rhenium, Palladium, Platinum and alloys thereof.

3. The magnetic recording medium according to claim 1, further comprising a seed layer formed between said substrate and said underlying layer and formed of at least one material selected from the group consisting of titanium, titanium nitride, ruthenium, hafnium, rhenium, palladium, platinum, nonmagnetic cobalt chromium alloy, magnesium oxide, indium tin oxide, nickel aluminium, and ferric aluminium.

4. The magnetic recording medium according to claim 1, further comprising a soft magnetic layer formed between said substrate and said underlying layer.

5. The magnetic recording medium according to claim 3, further comprising a soft magnetic layer formed between said substrate and said seed layer.

6. The magnetic recording medium according to claim 1, wherein said anisotropic magnetic field Hk and said saturation magnetization Ms satisfy the following relation $2.5 \leq Hk/4\pi Ms \leq 4.5$.

7. A magnetic recording/reproducing apparatus, comprising:
    a magnetic recording medium;
    a drive mechanism configured to support and rotate said magnetic recording medium;
    an underlying layer formed between said substrate and said perpendicular magnetic layer and having an HCP structure or an FCC structure; and
    a magnetic head configured to record/reproduce information in and from the magnetic recording medium;
    wherein said magnetic recording medium has an anisotropic magnetic field Hk and a saturation magnetization Ms which satisfy the following relation: $2 < Hk/4\pi Ms < 5$, and $Hk \geq 7kOe$; and
    wherein a majority of said perpendicular magnetic layer is made of CoPt series alloy containing one of Cr and O.

8. The magnetic recording/reading apparatus according to claim 7, wherein said underlying layer being formed of at least one material selected from the group consisting of ruthenium, titanium, hafnium, rhenium, Palladium, Platinum, and alloys thereof.

9. The magnetic recording/reading apparatus according to claim 7, further comprising a seed layer formed between said substrate and said underlying layer and formed of at least one material selected from the group consisting of titanium, titanium nitride, ruthenium, hafnium, rhenium, palladium, platinum nonmagnetic cobalt chromium alloy, magnesium oxide, indium tin oxide, nickel aluminium, and ferric aluminium.

10. The magnetic recording/reading apparatus according to claim 7, further comprising a soft magnetic layer formed between said substrate and said underlying layer.

11. The magnetic recording/reading apparatus according to claim 9, further comprising a soft magnetic layer formed between said substrate and said seed layer.

12. The magnetic recording medium according to claim 7, wherein said anisotropic magnetic field Hk and said saturation magnetization Ms satisfy the following relation $2.5 \leq Hk/4\pi Ms \leq 4.5$.

13. A magnetic recording medium according to claim 1, wherein said CoPt series alloy consists essentially of 30 to 88 at % of Co, 12 to 36 at % of Pt, 0 to 20 at % of Cr and 0 to 40 at % of O.

14. A magnetic recording/reproducing apparatus according to claim 7, wherein said CoPt series alloy consists essentially of 30 to 88 at % of Co, 12 to 36 at % of Pt, 0 to 20 at % of Cr and 0 to 40 at % of 0.

15. The magnetic recording medium according to claim 2, further comprising a seed layer formed between said substrate and said underlying layer and formed of at least one material selected from the group consisting of titanium, titanium nitride, ruthenium, hafnium, rhenium, palladium, platinum, nonmagnetic cobalt chromium alloy, magnesium oxide, indium tin oxide, nickel aluminium, and ferric aluminium.

16. The magnetic recording/reproducing apparatus according to claim 8, further comprising a seed layer formed between said substrate and said underlying layer and formed of at least one material selected from the group consisting of titanium, titanium nitride, ruthenium, hafnium, rhenium, palladium, platinum, nonmagnetic cobalt chromium alloy, magnesium oxide, indium tin oxide, nickel aluminium, and ferric aluminium.

* * * * *